Patented Jan. 26, 1937

2,068,801

UNITED STATES PATENT OFFICE 2,068,801

BOROSILICATE GLASS CONTAINING CERIUM

Harrison P. Hood, Corning, N. Y., assignor to Corning Glass Works, Corning, N. Y., a corporation of New York No Drawing. Application July 30, 1935, Serial No. 33,913

9 Claims. (Cl. 106—36.1)

This invention relates to glass compositions and more particularly to compositions containing substantial amounts of cerium.

Cerium has long been used as a coloring agent in non-borosilicate glasses, but in the melting of borosilicate glasses, and particularly low expansion borosilicates which contain cerium, great difficulty is experienced in dissolving and keeping the cerium dioxide in solution in the melt. The term "borosilicate glass" as used herein is meant to include only those glasses the composition of which contain 5% or more of boric oxide.

It is the object of this invention to make borosilicate glasses and particularly low expansion borosilicates, that is, borosilicates having a low alkali content, which contain substantial amounts of cerium, the same being entirely in solution and the glass being transparent and free from crystals of precipitated cerium dioxide.

I have found that the above object may be attained by introducing into such borosilicate glasses a substantial amount of barium and/or zinc, preferably in lieu of boric oxide but retaining at least 5% of boric oxide in the finished glass. As a result of the presence of barium or zinc, the cerium dioxide readily goes into solution in the glass and does not, as heretofore, tend to precipitate during fabrication of the glass into ware nor during subsequent reheating of the glass. Although barium may be used without zinc, it is preferable to add zinc also because the latter has a relatively low expansion factor and does not raise the expansion coefficient of the glass unduly. I have found that the minimum desirable amount of barium and/or zinc for best results is about 7% although under some circumstances, this may be decreased as, for example, when the alkali content is increased. Since increase of the alkali content raises the expansion coefficient of the glass in a marked degree, it is not desirable to increase the alkali above 10%.

As an example of glass batches which I have melted and which illustrate my invention, I give the following:

|  | A | B |
|---|---|---|
| Sand | 300 | 300 |
| Boric acid | 35 |  |
| Zinc oxide | 25 | 25 |
| Barium carbonate | 19 | 19 |
| Sodium carbonate | 10 | 10.5 |
| Niter | 14 | 14 |
| Borax | 100 | 103 |
| Lepidolite | 95 | 95 |
| Cerium oxide | 25 | 12 |
| Uranium oxide | 10 |  |
| Vanadium oxide |  | 12 |

The glasses resulting from melting the above batches have the following compositions as calculated from the batches.

|  | A | B |
|---|---|---|
|  | Percent | Percent |
| $SiO_2$ | 63.6 | 67.2 |
| $B_2O_3$ | 10.4 | 7.3 |
| ZnO | 4.5 | 4.8 |
| BaO | 2.7 | 2.8 |
| Alkali oxide | 7.7 | 8.3 |
| $Al_2O_3$ | 4.7 | 5.0 |
| $CeO_2$ | 4.5 | 2.3 |
| $U_3O_8$ | 1.8 |  |
| $V_2O_5$ |  | 2.3 |

I claim:

1. A borosilicate glass containing a substantial amount of cerium which also contains not more than 10% of alkali oxide and a substantial amount of an oxide of the group consisting of barium oxide and zinc oxide.

2. A borosilicate glass containing a substantial amount of cerium which also contains not more than 10% of alkali oxide and a substantial amount of barium oxide.

3. A borosilicate glass containing a substantial amount of cerium which also contains not more than 10% of alkali oxide and a substantial amount of zinc oxide.

4. A borosilicate glass containing a substantial amount of cerium which also contains not more than 10% of alkali oxide and a substantial amount of barium oxide and zinc oxide.

5. A silicate glass containing boric oxide, alkali oxide, cerium oxide, barium oxide and zinc oxide, the boric oxide being not less than 5%, the alkali oxide being not more than 10%, the cerium oxide not less than 2%, and the combined barium and zinc oxides not less than 7%.

6. A silicate glass containing boric oxide, alkali oxide, cerium oxide, barium oxide and zinc oxide, the boric oxide being not less than 5%, the alkali oxide being not more than 10%, the cerium oxide not less than 2%, and the combined barium and zinc oxides not less than 7%, and containing uranium oxide.

7. A silicate glass containing boric oxide, alkali oxide, cerium oxide, barium oxide and zinc oxide, the boric oxide being not less than 5%, the alkali oxide being not more than 10%, the cerium oxide not less than 2%, and the combined barium and zinc oxides not less than 7%, and containing vanadium oxide.

8. A glass containing approximately 63.6% $SiO_2$, 10.4% $B_2O_3$, 4.5% ZnO, 2.7% BaO, 7.7% alkali oxide, 4.7% $Al_2O_3$, 4.5% $CeO_2$, and 1.8% $U_3O_8$.

9. A glass containing approximately 67.2% $SiO_2$, 7.3% $B_2O_3$, 4.8% ZnO, 2.8% BaO, 8.3% alkali oxide, 5.0% $Al_2O_3$, 2.5% $CeO_2$ and 2.3% $V_2O_5$.

HARRISON P. HOOD.